(12) United States Patent (10) Patent No.: US 8,275,124 B2
Kurihara et al. (45) Date of Patent: Sep. 25, 2012

(54) THRESHOLD SECRET SHARING APPARATUS, THRESHOLD SECRET SHARING SCHEME, SECRET INFORMATION DECRYPTION METHOD, AND PROGRAM FOR THE SAME

(75) Inventors: Jun Kurihara, Saitama-ken (JP); Shinsaku Kiyomoto, Saitama-ken (JP); Toshiaki Tanaka, Saitama-ken (JP)

(73) Assignee: KDDI Corporation, Tokyo (JP)

( * ) Notice: Subject to any disclaimer, the term of this patent is extended or adjusted under 35 U.S.C. 154(b) by 985 days.

(21) Appl. No.: 12/014,471

(22) Filed: Jan. 15, 2008

(65) Prior Publication Data

US 2008/0205637 A1 Aug. 28, 2008

(30) Foreign Application Priority Data

Feb. 22, 2007 (JP) ................................. 2007-041954

(51) Int. Cl.
*H04L 29/06* (2006.01)
(52) U.S. Cl. ........................................................ 380/28
(58) Field of Classification Search ...................... 380/28
See application file for complete search history.

(56) References Cited

U.S. PATENT DOCUMENTS

| | | | |
|---|---|---|---|
| 2002/0032866 A1* | 3/2002 | Suga | 713/180 |
| 2002/0164033 A1* | 11/2002 | Rajasekaran | 380/278 |
| 2006/0072744 A1 | 4/2006 | Ogihara et al. | |
| 2007/0160197 A1* | 7/2007 | Kagaya et al. | 380/28 |
| 2008/0232580 A1* | 9/2008 | Hosaka et al. | 380/28 |

FOREIGN PATENT DOCUMENTS

| | | |
|---|---|---|
| JP | 2004213650 A | 7/2004 |
| JP | 2006-018850 | 1/2006 |

OTHER PUBLICATIONS

Kurihara et al, A New (k,n)—Threshold Secret Sharing Scheme and Its Extension, 2008, KDDI S&D Lab Inc. 455-470.*
Yoshihiro Fujii et al., "A Fast (2,n)—Threshold Scheme and Its Application," Toshiba Solutions Corporation, 3-22, Katamachi, Fuchu-shi, Tokyo 183-8512, Japan, pp. 1-6.
Adi Shamir, "How to Share a Secret, Programming Techniques," R. Rivest, Editor, Communications of the ACM, Nov. 1979, vol. 22, No. 11, pp. 612-613.

(Continued)

*Primary Examiner* — Edan Orgad
*Assistant Examiner* — Brian Olion
(74) *Attorney, Agent, or Firm* — Bainwood Huang (57) ABSTRACT

A threshold secret sharing apparatus, a threshold secret sharing scheme, a secret information recovery apparatus a secret information recovery method, and a program thereof are provided using XOR computation, thereby offering a general (k,n) threshold secret sharing scheme with high computation speed. Secret information K is divided into $(n_p-1)$ divided pieces of secret information $K_q$ ($n_p$ is a prime number which is equal to or greater than a secret distribution number n). Furthermore, dummy secret information $K_0$ is generated. Moreover, random numbers R, which are mutually independent are generated. Then, pieces of shares are created using exclusive-OR (XOR) operations based upon the dummy secret information $K_0$, the divided piece of secret information $K_q$, and the random numbers R. The pieces of shares thus generated are concatenated so as to generate n shares $S_i$, thereby providing a (k,n) threshold secret sharing scheme.

6 Claims, 2 Drawing Sheets

OTHER PUBLICATIONS

Jun Kurihara et al., "XOR, A (3,n)—Threshold Secret Sharing Scheme using XOR Operations," SCIS 2007, The 2007 Symposium on Cryptography and Information Security, Sasebo, Japan, Jan. 23-26, 2007, The Institute of Electronics, Information and Communication Engineers, pp. 1-6.

Nobuyuki Shina et al., "How to convert 1-out-of-n proof," SCIS 2004, The 2004 Symposium on Cryptography and Information Security, Sasebo, Japan, Jan. 27-30, 2004, The Institute of Electronics, Information and Communication Engineers, pp. 1-6.

* cited by examiner

THRESHOLD SECRET SHARING APPARATUS, THRESHOLD SECRET SHARING SCHEME, SECRET INFORMATION DECRYPTION METHOD, AND PROGRAM FOR THE SAME

BACKGROUND OF THE INVENTION

1. Field of the Invention

The present invention relates to a threshold secret sharing scheme for protecting secret information, a threshold secret sharing scheme, a secret information decryption method, and a program for carrying out the aforementioned threshold secret sharing scheme and secret information decryption method.

2. Description of the Related Art

In recent years, as information security becomes more and more important, there is an increased demand for countermeasures against information leaks and information loss. Accordingly, the (k,n) threshold secret sharing scheme as described in "How to share a secret" (A. Shamir, Commun. ACM, vol. 22 no. 11 pp. 612-613, 1979) (Non-patent document 1) has been attracting attention as a technique for maintaining information security while avoiding the risk of information loss. Here, in the (k,n) threshold secret sharing scheme, the confidential information is distributed into n shares (distribution). Furthermore, such an arrangement permits one to recover the information using desired k shares selected from among n shares (recovery).

However, in the (k,n) threshold secret sharing scheme described in "How to share a secret" (Non-patent document 1), decryption requires processing of a (k−1)-degree polynomial, leading to an enormous amount of calculation. In order to solve this problem, a (2,n) threshold secret sharing scheme using exclusive-OR (XOR) operations has been proposed as described in "A Fast (2, n)-Threshold Scheme and Its Application" (Yoshihiro Fujii, Minako Tada, Norikazu Hosaka, Koya Tochikubo, Takehisa Kato, proceeding of CSS2005, 2005) (Non-patent document 2), which provides high-speed distribution and recovery.

Also, as a threshold secret sharing scheme using XOR operations with a number of thresholds other than 2, "A (3,n)-threshold secret sharing scheme using XOR operations" (Jun Kurihara, Shinsaku Kiyomoto, Kazuhide Fukushima, Toshiaki Tanaka, proceeding of SCIS2007, 2007) (Non-patent document 3) proposes a (3,n) threshold secret sharing scheme using exclusive-OR (XOR) operations. However, no threshold secret sharing scheme using XOR operations has been proposed in which the number of thresholds is 4 or more. "How to convert 1-out-of-n proof into k-out-of-n proof" (Nobuyuki Shiina, Takeshi Okamoto, Eiji Okamoto, proceeding of SCIS2004, 2004) (Non-patent document 4) also proposes a (k,n) threshold secret sharing scheme using XOR operations or additive operations, which provides high-speed distribution and recovery. However, such a scheme requires a share data length which is several times greater than the data length of the secret information, leading to poor efficiency. Also, Japanese Unexamined Patent Application publication No. 2006-18850 (Patent document 1) proposes a (k,n) threshold secret sharing scheme. However, in some cases, such a scheme permits one to decrypt the secret information with the number of available shares being smaller than k, which does not satisfy the integrity of the threshold secret sharing scheme.

SUMMARY OF THE INVENTION

As described above, the (k,n) threshold secret sharing scheme described in "How to share a secret" (Non-patent document 1) has a problem of an enormous amount of computation. On the other hand, the scheme described in "How to convert 1-out-of-n proof into k-out-of-n proof" (Non-patent document 4) has a problem of increased share data length, which is several times the secret information data length. Accordingly, there is a demand for a high efficiency threshold secret sharing scheme, which provides high-speed computation using XOR operations, and which provides a share data length which is the same as that of the secret information. However, a general (k,n) threshold secret sharing scheme using XOR operations has not yet been proposed.

The present invention has been made in view of the aforementioned problems. Accordingly, it is an object thereof to provide a threshold secret sharing apparatus for implementing a general (k,n) threshold secret sharing scheme using XOR operations, the threshold secret sharing scheme, a secret information recovery method, and a program for carrying out the aforementioned threshold secret sharing scheme and secret information decryption method, thereby providing high-speed computation and the same data length of each share as that of the confidential information.

In order to solve the aforementioned problems, the present invention proposes the following arrangements.

(1) The present invention proposes a threshold secret sharing apparatus comprising: a divider which divides secret information K into ($n_p$−1) divided pieces of secret information $K_q$ ($n_p$ is a prime number which is equal to or greater than a secret distribution number); a dummy information generator which generates dummy partial secret information $K_0$; (k−1) random number generators which generate respective random numbers R which are mutually independent; a piece of share generator which generates pieces of shares by exclusive-OR (XOR) operations based upon the dummy partial secret information $K_0$, the divided pieces of secret information $K_q$, and the random numbers R; and a concatenating unit which concatenates the pieces of shares so as to create n shares $S_i$.

According to this aspect of the present invention, the divider divides secret information K into ($n_p$−1) divided pieces of secret information $K_q$ ($n_p$ is a prime number which is equal to or greater than a secret distribution number n). The dummy information generator generates dummy partial secret information $K_0$. The (k−1) random number generators generate respective random numbers R which are independent of each other. Then, the piece of share generator generates pieces of shares based upon the dummy partial secret information $K_0$, the divided pieces of secret information $K_q$, and the random numbers R using exclusive-OR (XOR) operations. The concatenating unit which concatenates the pieces of shares so as to create n shares $S_i$. Such an arrangement provides a general (k,n) threshold secret sharing apparatus using exclusive-OR (XOR) operation.

(2) The present invention proposes a threshold secret sharing method comprising: a first step for dividing secret information K into (np−1) divided pieces of secret information Kq (np is a prime number which is equal to or greater than a secret distribution number); a second step for generating dummy partial secret information K0; a third step for generating random numbers R which are mutually independent; a fourth step for generating pieces of shares using exclusive-OR (XOR) operations based upon the dummy partial secret information K0, the divided pieces of secret information Kq, and the random numbers R; and a fifth step for concatenating the pieces of shares so as to create n shares Si.

According to this aspect of the present invention, the secret information K is divided into $(n_p-1)$ divided pieces of secret information $K_q$ ($n_p$ is a prime number which is equal to or greater than a secret distribution number n). Furthermore, the dummy partial secret information $K_0$ is generated. Random numbers R, which are independent of each other, are generated. The pieces of shares are created based upon the dummy partial secret information $K_0$, the divided pieces of secret information $K_q$, and the random numbers R using exclusive-OR (XOR) operations. The pieces of shares are concatenated so as to create n shares $S_i$. Thus, such an arrangement provides a general (k,n) threshold secret sharing scheme using exclusive-OR (XOR) operations.

(3) The present invention proposes a program which instructs a computer to execute: a first step for dividing secret information K into (np−1) divided pieces of secret information Kq (np is a prime number which is equal to or greater than a secret distribution number); a second step for generating dummy partial secret information K0; a third step for generating random numbers R which are mutually independent; a fourth step for generating pieces of shares using exclusive-OR (XOR) operations based upon the dummy partial secret information K0, the divided pieces of secret information Kq, and the random numbers R; and a fifth step for concatenating the pieces of shares so as to create n shares Si.

According to this aspect of the present invention, the secret information K is divided into $(n_p-1)$ divided pieces of secret information $K_q$ ($n_p$ is a prime number which is equal to or greater than a secret distribution number n). Furthermore, the dummy partial secret information $K_0$ is generated. Random numbers R, which are independent of each other, are generated. The pieces of shares are created based upon the dummy partial secret information $K_0$, the divided pieces of secret information $K_q$, and the random numbers R using exclusive-OR (XOR) operations. The pieces of shares are concatenated so as to create n shares $S_i$. Thus, such an arrangement provides a program for carrying out a general (k,n) threshold secret sharing scheme using exclusive-OR (XOR) operations.

(4) The present invention proposes a secret information recovery method comprising: a first step for dividing k shares obtained beforehand into $n_p(k-1)$ pieces of shares; and a second step for removing the random numbers by using exclusive-OR (XOR) operations, in increments of the set of random number, from each of the pieces of shares on the assumption that there are (k−1) sets of random numbers and there are the $n_p$ random numbers in each set of random number.

According to this aspect of the present invention, k shares obtained beforehand are divided into $n_p(k-1)$ pieces of shares. The random numbers are removed by using exclusive-OR (XOR) operations, in increments of the set of the random number, from each of the pieces of shares on the assumption that there are (k−1) sets of random numbers and there are the $n_p$ random numbers in each set of the random numbers. Such an arrangement provides k shares, thereby recovering secret information in a sure manner.

(5) The present invention proposes a program which instructs a computer to execute: a first step for dividing k shares obtained beforehand into $n_p(k-1)$ pieces of shares; and a second step for removing the random numbers by using exclusive-OR (XOR) operations, in increments of the set of random number, from each of the pieces of shares on the assumption that there are (k−1) sets of random numbers and there are the $n_p$ random numbers for each kind of random number.

According to this aspect of the present invention, k shares obtained beforehand are divided into $n_p(k-1)$ pieces of shares. The random numbers are removed by using exclusive-OR (XOR) operations, in increments of the set of the random number, from each of the pieces of shares on the assumption that there are (k−1) sets of random numbers and there are the $n_p$ random numbers in each set of the random numbers. Such an arrangement provides k shares, thereby recovering secret information in a sure manner.

The present invention provides a general (k,n) threshold secret sharing scheme using exclusive-OR (XOR) computation. Such an arrangement allows secret information to be distributed and recovered using XOR computation, thereby providing high-speed processing.

DESCRIPTION OF THE PREFERRED EMBODIMENTS

Description will be made regarding an embodiment of the present invention with reference to the drawings.

Figure 1:
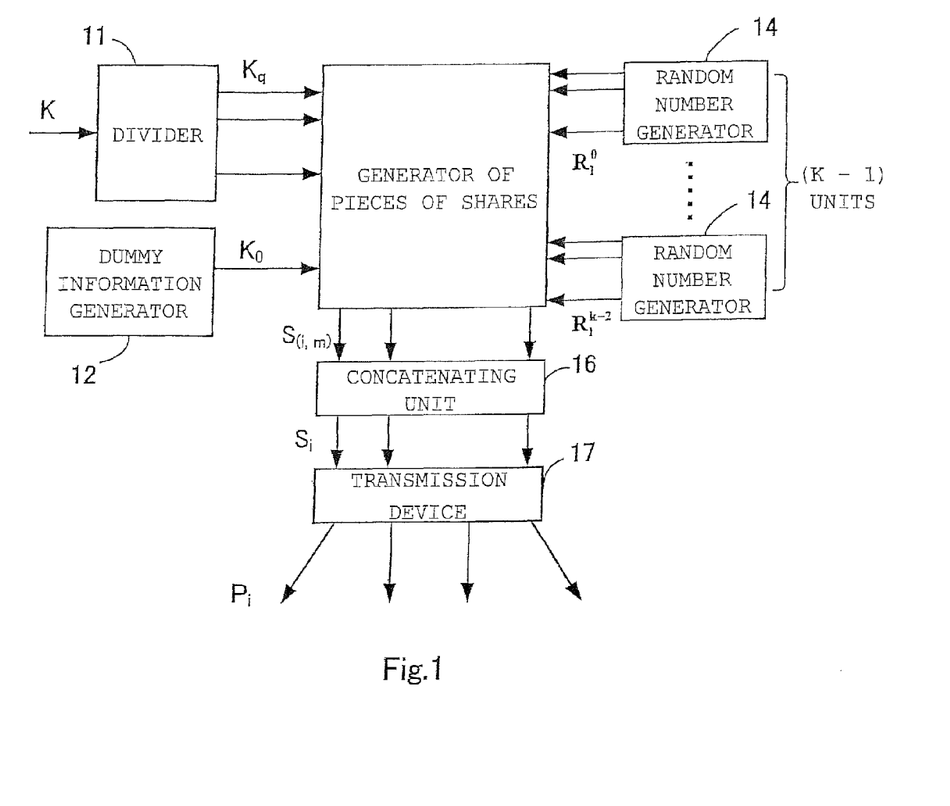
FIG. 1 is a functional block diagram for describing generation of share and a distributing apparatus according to an embodiment of the present invention.

The present embodiment provides distribution and recovery of secret information using a (k,n) threshold method. FIG. 1 is a functional block diagram which shows a share generation/distribution apparatus according to the present embodiment in a schematic fashion.

In FIG. 1, secret information K is transmitted to a divider 11, and is divided into $(n_p-1)$ divided pieces of secret information $K_q$. Furthermore, a dummy secret information generator 12 creates dummy partial secret information $K_0$. The dummy partial secret information $K_0$ and the divided pieces of secret information $K_q$ are transmitted to a piece of share generation unit 13.

A random number generator 14 generates mutually independent random numbers R. In the present embodiment, (k−1) random number generators 14 having the same function are included. The random number R generated by each random number generator 14 is transmitted to the piece of share generator 13.

The piece of share generator 13 performs exclusive-OR (XOR) operations using the dummy partial secret information $K_0$, the $(n_p-1)$ divided pieces of secret information $K_q$, and the random numbers R generated by the random number generators 14, which generates the pieces of shares. A concatenating unit 16 concatenates the pieces of shares so as to generate n shares $S_i$. A transmission device 17 effects high security transmission of the shares $S_i$ to participants $P_i$.

The present embodiment provides a general (k,n) threshold secret sharing scheme using a desired secret distribution number n, which allows the secret information K to be distributed among the shares $S_i$ with the secret distribution number n. With such an arrangement, the computation necessary for distribution the secret information is exclusive-OR (XOR) operations, thereby providing high-speed computation.

It should be noted that, with such an arrangement according to the present embodiment, there is a need to equally divide the secret information into $(n_p-1)$ segments. Here, $n_p$ is a prime number which is equal to or greater than n. Accordingly, in a case in which the secret distribution number is a composite number, n shares are selected and used from among those obtained by a $(k,n_p)$ threshold scheme using a prime number $n_p$ which is greater than n, thereby implementing the (k,n) threshold scheme.

Further detailed description will be made regarding the threshold secret sharing scheme according to the present embodiment. First, prior to description of the threshold secret sharing scheme according to the present embodiment, the operators and symbols employed in this specification are defined as follows.

[Expression 1]

Arithmetic Operator: Arithmetic Operations are performed modulo $n_p$ (For example, the computation $c(a \pm b)$ equals $c(a \pm b) \bmod n_p$)

$\oplus$: Bitwise exclusive-or (XOR) operation $\|$: Concatenation of binary sequence n: The number of participants ($n \in N, 2 \leq n$)

k: Threshold ($k \in N, 2 \leq k \leq n$)

$n_p$: A prime number such that $n_p \geq n$ d: Data bit length in each processing ($d \in N$)

$p_i$: Participant ($i \in N_0, 0 \leq i \leq n-1$)

K: Secret Information ($K \in \{0,1\}^{d(n_p-1)}$)

$K_q$: A divided piece of secret information such that $K_q \in \{0,1\}^d, q \in N, 1 \leq q \leq n_p-1, K_1\|K_2\| \ldots K_{n_p-1}=K$ $K_0$: A dummy divided piece of secret information ($K_0 \in \{0\}^d$)

$R_l^t$: A random number ($R_l^t \in \{0,1\}^d, 0 \leq t \leq k-2, 0 \leq l \leq n_p-1$)

$S_i$: A share which is send to the participant $P_i$ $S_{(i,m)}$: A Piece of share $S_i$ which is send to the participant $P_i$ ($S_{(i,0)}\|S_{(i,1)}\| \ldots \|S_{(i,n_p-2)}=S_i, 0 \leq m \leq n_p-2$)

First, description will be made regarding the distribution processing method. In the threshold secret sharing method according to the present embodiment, the distribution processing is performed according to the following procedure, which implements the (k,n) threshold secret sharing scheme.

It should be noted that, with such an arrangement according to the present invention, there is a need to equally divide the secret information K into $(n_p-1)$ segments. Here, $n_p$ is a prime number which is equal to or greater than n. Accordingly, in a case in which the secret distribution number is a composite number, n shares are selected and used from among those obtained by a $(k,n_p)$ threshold secret sharing scheme using a prime number $n_p$ which is greater than n, thereby implementing the (k,n) threshold scheme.

(Step 1)

The secret information K is divided into $(n_p-1)$ divided pieces of secret information $K_q$.

[Expression 2]

$K=K_1\|K_2\| \ldots K_{n_p-1}$ (Step 2)

The dummy partial secret information $K_0$ is created.

(Step 3)

The random numbers $R_0^0, \ldots, R_{n_p-1}^0, \ldots, R_0^{k-2}, \ldots, R_{n_p-1}^{k-2}$ are independently generated $n_p$ times, thereby independently generating $(k-1)n_p$ random numbers.

(Step 4)

The pieces of shares $S_{(i, m)}$ are generated as follows using XOR computation.

$$S_{(i,m)} = \left\{ \bigoplus_{t=0}^{k-2} R_{t \cdot i+m}^t \right\} \oplus K_{m-i}$$ [Expression 3]

$(0 \leq i \leq n-1, 0 \leq m \leq n_p - 2)$ (Step 5)

The pieces of shares $S_{(i, 0)}$ through $S_{(i, n_p-2)}$ are concatenated so as to generate the share $S_i$. The share $S_i$ thus generated is transmitted via high security transmission to the participant $P_i$.

[Expression 4]

$S_i = S_{(i,0)} \| S_{(i,1)} \| \ldots \| S_{(i,n_p-3)} \| S_{(i,n_p-2)}$

Table 1 shows a table of the pieces of shares generated according to the aforementioned Steps. With such an arrangement, the bit number to be sent to each administrator is the same as that of K.

TABLE 1

Table for structure of shares in (k, n)-threshold scheme

| | | m = 0 | m = 1 | ... | m = $n_p - 2$ |
|---|---|---|---|---|---|
| $P_0$ | $S_{(0,m)}$ | $\left\{\bigoplus_{t=0}^{k-2} R_0^t\right\} \oplus K_0$ | $\left\{\bigoplus_{t=0}^{k-2} R_1^t\right\} \oplus K_1$ | ... | $\left\{\bigoplus_{t=0}^{k-2} R_{n_p-2}^t\right\} \oplus K_{n_p-2}$ |
| $P_1$ | $S_{(1,m)}$ | $\left\{\bigoplus_{t=0}^{k-2} R_t^t\right\} \oplus K_{n_p-1}$ | $\left\{\bigoplus_{t=0}^{k-2} R_{t+1}^t\right\} \oplus K_0$ | ... | $\left\{\bigoplus_{t=0}^{k-2} R_{t+n_p-2}^t\right\} \oplus K_{n_p-3}$ |

TABLE 1-continued

Table for structure of shares in (k, n)-threshold scheme

| | | m = 0 | m = 1 | ... | m = $n_p$ − 2 |
|---|---|---|---|---|---|
| $P_{n-1}$ | $S_{(n-1, m)}$ | $\{\bigoplus_{t=0}^{k-2} R_{t \cdot (n-1)}^t\} \oplus K_{1-n}$ | $\{\bigoplus_{t=0}^{k-2} R_{t \cdot (n-1)+1}^t\} \oplus K_{2-n}$ | ... | $\{\bigoplus_{t=0}^{k-2} R_{t \cdot (n-1)+(n_p-2)}^t\} \oplus K_{n_p-n-1}$ |

Next, description will be made regarding the recovery method. Recovery is performed using a recovery apparatus shown in FIG. 2. In a case in which shares can be received from (k+1) or more participants, the shares are received from desired k participants. Then, the k arbitrary shares thus received are input to the apparatus. That is to say, with such an arrangement, the divided pieces of secret information is recovered based upon the pieces of shares selected from the pieces of shares shown in Table 1. Such an arrangement permits all the divided pieces of secret information to be recovered based upon a arbitrary combination of k shares. Specifically, the recovery apparatus comprises a reception device 21, a divider 22, an XOR operation device 23, and a concatenating unit 24. Upon reception of k shares, the reception device 21 outputs the k shares thus received to the divider 22. The divider 22 divides the k shares into $k(n_p-1)$ pieces of shares. The XOR operation device 23 performs XOR operations with the $k(n_p-1)$ pieces of shares thus outputs $(n_p-1)$ divided pieces of secret information. The concatenating unit 24 concatenates the $(n_p-1)$ divided pieces of secret information thus generated, thereby recovering the secret information.

Figure 2:
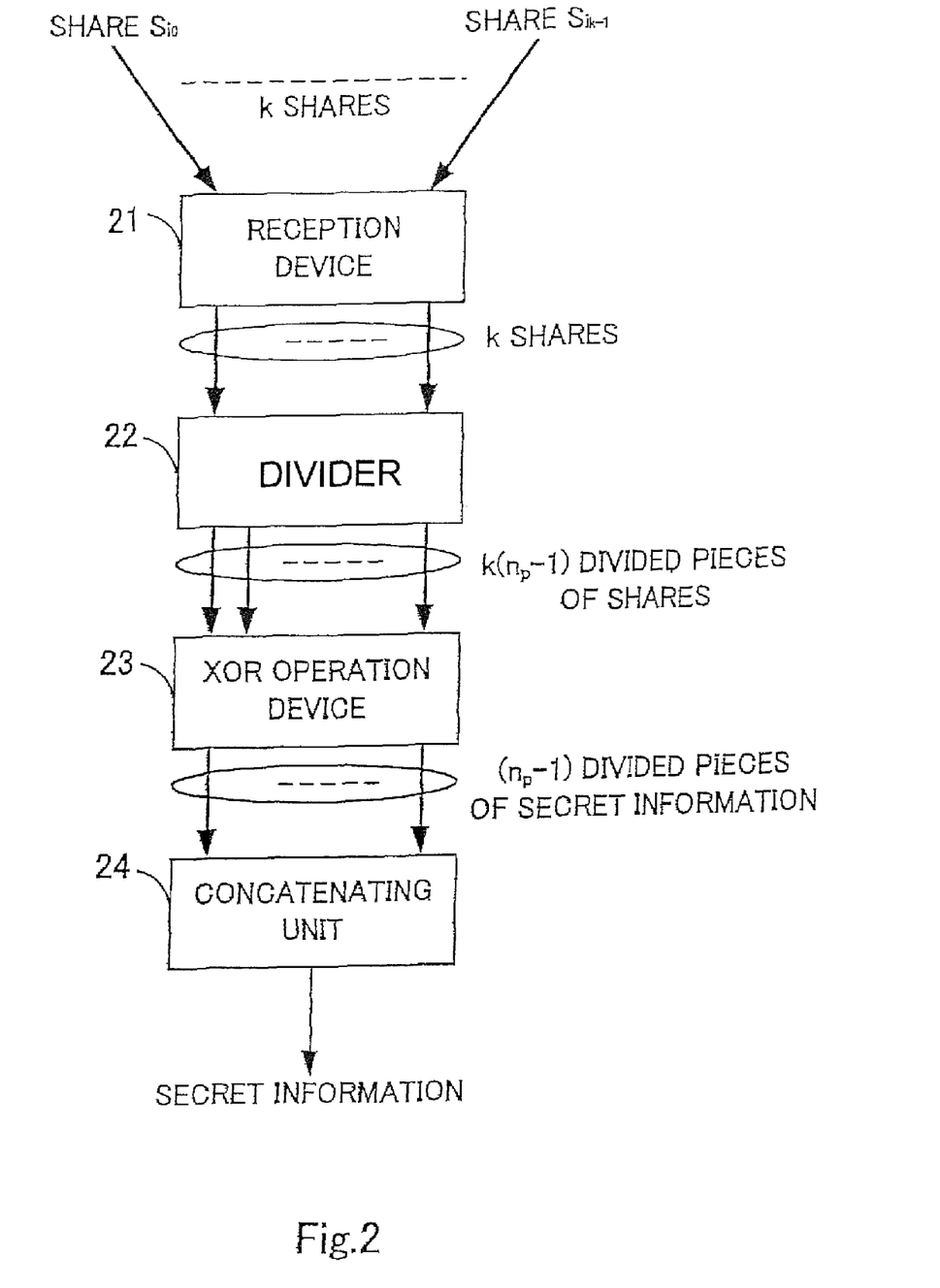
FIG. 2 is a functional block diagram for describing recovery of the share according to an embodiment of the present invention.

Description will be made below regarding a procedure for the recovery processing. Let us say that k participants $P_{i0}$ through $P_{ik-1}$ (who are mutually different) can provide the respective k shares $S_{i0}$ through $S_{ik-1}$ ($0 \leq i_0$ to $i_{k-1} \leq n-1$, where $i_0$ through $i_{k-1}$ are mutually different) which are input to the secret information decryption unit 21.

(Step 1)

Each of the shares $S_{i0}$ through $S_{ik-1}$ is divided into pieces of shares, thereby obtaining the following $k(n_p-1)$ pieces of shares.

$$S_{(i_0,0)}, \quad S_{(i_0,1)}, \quad \ldots, \quad S_{(i_0,n_p-3)}, \quad S_{(i_0,n_p-2)},$$
$$\vdots \quad \vdots \quad \vdots \quad \vdots \quad \vdots$$
$$S_{(i_{k-1},0)}, \quad S_{(i_{k-1},1)}, \quad \ldots, \quad S_{(i_{k-1},n_p-3)}, \quad S_{(i_{k-1},n_p-2)}$$

[Expression 5]

(Step 2)

All the divided pieces of secret information $K_1, K_2, \ldots, K_{n_p-1}$ are recovered based upon the set of pieces of shares.

(Step 3)

All the divided pieces of secret information are concatenated, thereby recovering the original secret information K.

[Expression 6]

$K = K_1 \| K_2 \| \ldots \| K_{n_p-1}$

It can be understood that the original secret information can be recovered based upon the k shares according to the aforementioned processing steps.

Embodiment 1

Description will be made regarding a specific example of decryption using a (4,5) threshold secret sharing scheme for $n = n_p = 5$. The secret information decryption device employing the (4,5) threshold secret sharing scheme recovers the pieces of shares $K_1, K_2, K_3$, and $K_4$ with reference the table of pieces of shares shown in FIG. 2.

[Table 2]

TABLE 2

Table for structure of shares in (4, 5)-threshold scheme for $n = n_p = 5$

| | | m = 0 | m = 1 | m = 2 | m = 3 |
|---|---|---|---|---|---|
| $P_0$ | $S_{(0,m)}$ | $K_0 \oplus R_0^0 \oplus R_0^1 \oplus R_0^2$ | $K_1 \oplus R_1^0 \oplus R_1^1 \oplus R_1^2$ | $K_2 \oplus R_2^0 \oplus R_2^1 \oplus R_2^2$ | $K_3 \oplus R_3^0 \oplus R_3^1 \oplus R_3^2$ |
| $P_1$ | $S_{(1,m)}$ | $K_4 \oplus R_0^0 \oplus R_1^1 \oplus R_2^2$ | $K_0 \oplus R_1^0 \oplus R_2^1 \oplus R_3^2$ | $K_1 \oplus R_2^0 \oplus R_3^1 \oplus R_4^2$ | $K_2 \oplus R_3^0 \oplus R_4^1 \oplus R_0^2$ |
| $P_2$ | $S_{(2,m)}$ | $K_3 \oplus R_0^0 \oplus R_2^1 \oplus R_4^2$ | $K_4 \oplus R_1^0 \oplus R_3^1 \oplus R_0^2$ | $K_0 \oplus R_2^0 \oplus R_4^1 \oplus R_1^2$ | $K_1 \oplus R_3^0 \oplus R_0^1 \oplus R_2^2$ |
| $P_3$ | $S_{(3,m)}$ | $K_2 \oplus R_0^0 \oplus R_3^1 \oplus R_1^2$ | $K_3 \oplus R_1^0 \oplus R_4^1 \oplus R_2^2$ | $K_4 \oplus R_2^0 \oplus R_0^1 \oplus R_3^2$ | $K_0 \oplus R_3^0 \oplus R_1^1 \oplus R_4^2$ |
| $P_4$ | $S_{(4,m)}$ | $K_1 \oplus R_0^0 \oplus R_4^1 \oplus R_3^2$ | $K_2 \oplus R_1^0 \oplus R_0^1 \oplus R_4^2$ | $K_3 \oplus R_2^0 \oplus R_1^1 \oplus R_0^2$ | $K_4 \oplus R_3^0 \oplus R_2^1 \oplus R_1^2$ |

In this recovery example, let us consider a case in which four participants $P_1, P_2, P_3$, and $P_4$ can provide respective share.

(Step 1)

Each of the aforementioned share is divided, thereby obtaining 16 pieces of shares shown in Expression 7.

[Expression 7]

$S_{(1,0)}, S_{(1,1)}, S_{(1,2)}, S_{(1,3)},$
$S_{(2,0)}, S_{(2,1)}, S_{(2,2)}, S_{(2,3)},$
$S_{(3,0)}, S_{(3,1)}, S_{(3,2)}, S_{(3,3)},$
$S_{(4,0)}, S_{(4,1)}, S_{(4,2)}, S_{(4,3)}$ (Step 2)

Next, the divided pieces of secret information are recovered as shown in Expression 8 with reference to the table shown in Table 2.

[Expression 8]

$K_1 = S_{(1,1)} \oplus S_{(1,3)} \oplus S_{(2,1)} \oplus S_{(3,0)} \oplus S_{(4,0)} \oplus S_{(4,3)}$
$K_2 = S_{(1,0)} \oplus S_{(2,1)} \oplus S_{(2,2)} \oplus S_{(3,0)} \oplus S_{(3,1)} \oplus S_{(4,2)}$
$K_3 = S_{(1,3)} \oplus S_{(2,1)} \oplus S_{(2,2)} \oplus S_{(2,3)} \oplus S_{(3,0)} \oplus S_{(3,1)} \oplus S_{(3,2)} \oplus S_{(4,0)}$
$K_4 = S_{(1,0)} \oplus S_{(1,2)} \oplus S_{(2,0)} \oplus S_{(3,0)} \oplus S_{(3,1)} \oplus S_{(3,2)} \oplus S_{(3,3)} \oplus S_{(4,0)} \oplus S_{(4,1)} \oplus S_{(4,3)}$ (Step 3)

Next, the divided pieces of secret information thus recovered are concatenated, thereby recovering the original secret information K as shown in Expression 9.

[Expression 9]
$K=K_1\|K_2\|K_3\|K_4$

Embodiment 2

Next, description will be made regarding another specific example of decryption using a (5,7) threshold secret sharing scheme for $n=n_p=7$. Table 3 shows a table of pieces of shares obtained using the (5,7) threshold secret sharing scheme.
[Table 3]

TABLE 3

Table for structure of shares in (5, 7)-threshold scheme for $n = n_p = 7$

| | $m = 0$ | $m = 1$ | $m = 2$ | $m = 3$ | $m = 4$ | $m = 5$ |
|---|---|---|---|---|---|---|
| $P_0$  $S_{(0,m)}$ | $\left\{\bigoplus_{t=0}^{3} R_0^t\right\} \oplus K_0$ | $\left\{\bigoplus_{t=0}^{3} R_1^t\right\} \oplus K_1$ | $\left\{\bigoplus_{t=0}^{3} R_2^t\right\} \oplus K_2$ | $\left\{\bigoplus_{t=0}^{3} R_3^t\right\} \oplus K_3$ | $\left\{\bigoplus_{t=0}^{3} R_4^t\right\} \oplus K_4$ | $\left\{\bigoplus_{t=0}^{3} R_5^t\right\} \oplus K_5$ |
| $P_1$  $S_{(1,m)}$ | $\left\{\bigoplus_{t=0}^{3} R_t^t\right\} \oplus K_6$ | $\left\{\bigoplus_{t=0}^{3} R_{t+1}^t\right\} \oplus K_0$ | $\left\{\bigoplus_{t=0}^{3} R_{t+2}^t\right\} \oplus K_1$ | $\left\{\bigoplus_{t=0}^{3} R_{t+3}^t\right\} \oplus K_2$ | $\left\{\bigoplus_{t=0}^{3} R_{t+4}^t\right\} \oplus K_3$ | $\left\{\bigoplus_{t=0}^{3} R_{t+5}^t\right\} \oplus K_4$ |
| $P_2$  $S_{(2,m)}$ | $\left\{\bigoplus_{t=0}^{3} R_{2t}^t\right\} \oplus K_5$ | $\left\{\bigoplus_{t=0}^{3} R_{2t+1}^t\right\} \oplus K_6$ | $\left\{\bigoplus_{t=0}^{3} R_{2t+2}^t\right\} \oplus K_0$ | $\left\{\bigoplus_{t=0}^{3} R_{2t+3}^t\right\} \oplus K_1$ | $\left\{\bigoplus_{t=0}^{3} R_{2t+4}^t\right\} \oplus K_2$ | $\left\{\bigoplus_{t=0}^{3} R_{2t+5}^t\right\} \oplus K_3$ |
| $P_3$  $S_{(3,m)}$ | $\left\{\bigoplus_{t=0}^{3} R_{3t}^t\right\} \oplus K_4$ | $\left\{\bigoplus_{t=0}^{3} R_{3t+1}^t\right\} \oplus K_5$ | $\left\{\bigoplus_{t=0}^{3} R_{3t+2}^t\right\} \oplus K_6$ | $\left\{\bigoplus_{t=0}^{3} R_{3t+3}^t\right\} \oplus K_0$ | $\left\{\bigoplus_{t=0}^{3} R_{3t+4}^t\right\} \oplus K_1$ | $\left\{\bigoplus_{t=0}^{3} R_{3t+5}^t\right\} \oplus K_2$ |
| $P_4$  $S_{(4,m)}$ | $\left\{\bigoplus_{t=0}^{3} R_{4t}^t\right\} \oplus K_3$ | $\left\{\bigoplus_{t=0}^{3} R_{4t+1}^t\right\} \oplus K_4$ | $\left\{\bigoplus_{t=0}^{3} R_{4t+2}^t\right\} \oplus K_5$ | $\left\{\bigoplus_{t=0}^{3} R_{4t+3}^t\right\} \oplus K_6$ | $\left\{\bigoplus_{t=0}^{3} R_{4t+4}^t\right\} \oplus K_0$ | $\left\{\bigoplus_{t=0}^{3} R_{4t+5}^t\right\} \oplus K_1$ |
| $P_5$  $S_{(5,m)}$ | $\left\{\bigoplus_{t=0}^{3} R_{5t}^t\right\} \oplus K_2$ | $\left\{\bigoplus_{t=0}^{3} R_{5t+1}^t\right\} \oplus K_3$ | $\left\{\bigoplus_{t=0}^{3} R_{5t+2}^t\right\} \oplus K_4$ | $\left\{\bigoplus_{t=0}^{3} R_{5t+3}^t\right\} \oplus K_5$ | $\left\{\bigoplus_{t=0}^{3} R_{5t+4}^t\right\} \oplus K_6$ | $\left\{\bigoplus_{t=0}^{3} R_{5t+5}^t\right\} \oplus K_0$ |
| $P_6$  $S_{(6,m)}$ | $\left\{\bigoplus_{t=0}^{3} R_{6t}^t\right\} \oplus K_1$ | $\left\{\bigoplus_{t=0}^{3} R_{6t+1}^t\right\} \oplus K_2$ | $\left\{\bigoplus_{t=0}^{3} R_{6t+2}^t\right\} \oplus K_3$ | $\left\{\bigoplus_{t=0}^{3} R_{6t+3}^t\right\} \oplus K_4$ | $\left\{\bigoplus_{t=0}^{3} R_{6t+4}^t\right\} \oplus K_5$ | $\left\{\bigoplus_{t=0}^{3} R_{6t+5}^t\right\} \oplus K_6$ |

In this decryption example, let us consider a case in which five administrators $P_1$, $P_2$, $P_3$, $P_4$, and $P_5$ can provide respective share.

(Step 1)

Each of the aforementioned share is divided, thereby obtaining 30 pieces of shares shown in Expression 10.
[Expression 10]
$S_{(1,0)}, S_{(1,1)}, S_{(1,2)}, S_{(1,3)}, S_{(1,4)}, S_{(1,5)},$
$S_{(2,0)}, S_{(2,1)}, S_{(2,2)}, S_{(2,3)}, S_{(2,4)}, S_{(2,5)},$
$S_{(3,0)}, S_{(3,1)}, S_{(3,2)}, S_{(3,3)}, S_{(3,4)}, S_{(3,5)},$
$S_{(4,0)}, S_{(4,1)}, S_{(4,2)}, S_{(4,3)}, S_{(4,4)}, S_{(4,5)},$
$S_{(5,0)}, S_{(5,1)}, S_{(5,2)}, S_{(5,3)}, S_{(5,4)}, S_{(5,5)},$ (Step 2)

Next, the divided pieces of secret information are recovered as shown in Expression 11 with reference to the table shown in Table 3.
[Expression 11]
$K_1 = S_{(1,1)} \oplus S_{(1,5)} \oplus$
$\quad S_{(2,5)} \oplus$
$\quad S_{(3,0)} \oplus S_{(3,2)} \oplus S_{(3,3)} \oplus S_{(3,4)} \oplus S_{(3,5)} \oplus$
$\quad S_{(4,2)} \oplus$
$\quad S_{(5,0)} \oplus S_{(5,1)} \oplus S_{(5,3)} \oplus S_{(5,4)} \oplus S_{(5,5)},$
$K_2 = S_{(1,0)} \oplus S_{(1,3)} \oplus S_{(1,4)} \oplus$
$\quad S_{(2,0)} \oplus S_{(2,1)} \oplus S_{(2,2)} \oplus S_{(2,3)} \oplus S_{(2,4)} \oplus$
$\quad S_{(3,3)} \oplus S_{(3,4)} \oplus S_{(3,5)} \oplus$
$\quad S_{(4,2)} \oplus S_{(4,3)} \oplus$
$\quad S_{(5,1)} \oplus S_{(5,4)} \oplus S_{(5,5)},$
$K_3 = S_{(1,4)} \oplus$
$\quad S_{(2,1)} \oplus S_{(2,2)} \oplus S_{(2,3)} \oplus S_{(2,4)} \oplus$
$\quad S_{(3,1)} \oplus S_{(3,4)} \oplus S_{(3,5)} \oplus$
$\quad S_{(4,2)} \oplus S_{(4,3)} \oplus S_{(4,4)} \oplus$
$\quad S_{(5,5)},$
$K_4 = S_{(1,1)} \oplus$
$\quad S_{(2,2)} \oplus S_{(2,3)} \oplus S_{(2,4)} \oplus$
$\quad S_{(3,1)} \oplus S_{(3,2)} \oplus S_{(3,5)} \oplus$
$\quad S_{(4,2)} \oplus S_{(4,3)} \oplus S_{(4,4)} \oplus S_{(4,5)} \oplus$
$\quad S_{(5,2)},$
$K_5 = S_{(1,1)} \oplus S_{(1,2)} \oplus S_{(1,5)} \oplus$
$\quad S_{(2,3)} \oplus S_{(2,4)} \oplus$
$\quad S_{(3,1)} \oplus S_{(3,2)} \oplus S_{(3,3)} \oplus$
$\quad S_{(4,0)} \oplus S_{(4,1)} \oplus$
$\quad S_{(5,0)} \oplus S_{(5,1)} \oplus S_{(5,4)} \oplus S_{(5,5)},$
$K_6 = S_{(1,0)} \oplus S_{(1,4)} \oplus$
$\quad S_{(2,4)} \oplus$
$\quad S_{(3,0)} \oplus S_{(3,5)} \oplus$
$\quad S_{(4,1)} \oplus$
$\quad S_{(5,1)} \oplus S_{(5,5)}.$ (Step 3)

Next, the divided pieces of secret information are concatenated, thereby decrypting the original secret information K as shown in Expression 12.
[Expression 12]
$K = K_1 \| K_2 \| K_3 \| K_4 \| K_5 \| K_6$ As described above, the present embodiment provides a secret sharing system according to a (k,n) threshold secret sharing scheme using XOR operations, which offers high-speed generation of share and high-speed recovery of secret information.

It should be noted that an arrangement may be made in which the above-described distribution processing and recovery processing are stored in the form of a program in a computer-readable recording medium. With such an arrangement, the program thus stored is read out via a recording device, and the program thus read out is executed, thereby implementing the control operation according to the present invention. The term "computer system" as used here includes an OS and hardware such as peripheral devices etc.

Also, the computer system may employ a WWW (World Wide Web) system. With such an arrangement, the computer system include a homepage providing environment (or homepage display environment). Also, a computer system storing the aforementioned program in a storage device or the like may transmit this program to other computer systems via a transmission medium or transmission waves in the transmission medium. Here, the term "transmission medium which transmits a program" as used here represents a medium which has a function of transmitting information, examples of which include a network (communication network) such as the Internet, and a communication circuit (communication line) such as a telephone circuit.

Also, the aforementioned program may execute a part of the above-described functions. Also, the aforementioned program may be a partial program. Such an arrangement allows the user to execute the above-described functions using a combination of the partial program and another program stored beforehand in the computer system. That is to say, the aforementioned program may be a differential file (differential program).

Detailed description has been made regarding the embodiments of the present invention with reference to the drawings. However, it should be noted that specific arrangements according to the present invention are not restricted to the above-described embodiments. Rather, the present invention encompasses various designs etc., without departing from the scope and spirit of the present invention.

It should be noted that the present invention is applicable to company internal confidential information processing.

What is claimed is:

1. A threshold secret sharing apparatus configured by a computer comprising:

a dividing means which divides inputted secret information K into same size ($n_p-1$) divided pieces of secret information $K_q$ ($n_p$ is a prime number which is equal to or greater than a secret distribution number) according to a program loaded into the computer, the secret information K being divided according to a first expression $K = K_1 \| K_2 \| \ldots \| K_{n_p-1}$ whose operators and symbols are defined according to a set of definitions including $\oplus$: Bitwise exclusive-or (XOR) operation $\|$: Concatenation of binary sequence n: The number of participants ($n \in N$, $2 \leq n$)

k: Threshold ($k \in N$, $2 \leq k \leq n$)

$n_p$: A prime number such that ($n_p \geq n$)

d: Data bit length in each processing ($d \in N$)

$p_i$: Participant ($i \in N_0$, $0 \leq i \leq n-1$)

K: Secret information ($K \in \{0,1\}^{d(n_p-1)}$)

$K_q$: A divided piece of secret information such that $K_q \in \{0,1\}^d$, $q \in N, 1 \leq q \leq n_p-1, K_1 \| K_2 \| \ldots K_{n_p-1} = K$ $K_0$: A dummy divided piece of secret information ($K_0 \in \{0\}^d$)

$R_l^t$: A random number ($R_l^t \in \{0,1\}^d, 0 \leq t \leq k-2, 0 \leq l \leq n_p-1$)

$S_i$: A share which is sent to the participant $P_i$ $S_{(i,m)}$: A piece of share $S_i$ which is sent to the participant $P_i$, ($S_{(i,0)} \| S_{(i,1)} \| \Lambda \| S_{(i,n_p-2)} = S, 0 \leq m \leq n_p-2$);

a dummy information generating means which generates dummy partial secret information $K_0$ according to a program loaded into the computer, the symbol $K_0$ being defined according to the set of definitions;

(k−1) random number generating means which generate respective sets of random numbers $R_l^t$ which are mutually independent according to a program loaded into the computer, the symbols k and $R_l^t$ being defined according to the set of definitions;

a generating means of pieces of shares, which generates pieces of shares by exclusive-OR (XOR) operations based upon the dummy partial secret information $K_0$, the divided pieces of secret information $K_q$, and the random numbers $R_l^t$ according to a program loaded into the computer, the pieces of shares being generated according to a second expression $$S_{(i,m)} = \left\{\bigoplus_{t=0}^{k-2} R_{t \cdot i+m}^t\right\} \oplus K_{m-i}, (0 \leq i \leq n-1, 0 \leq m \leq n_p-2)$$

whose operators and symbols are defined according to the set of definitions; and a concatenating means which concatenates the pieces of shares so as to generate n shares $S_i$ according to a program loaded into the computer, the pieces of shares being concatenated according to a third expression $S_i = S_{(i,0)} \| S_{(i,1)} \| \ldots \| S_{(i,n_p-3)} \| S_{(i,n_p-2)}$ whose operators and symbols are defined according to the set of definitions.

2. A threshold secret sharing method executed by operation of a computer comprising:

dividing inputted secret information K into same size ($n_p-1$) divided pieces of secret information $K_q$ ($n_p$ is a prime number which is equal to or greater than a secret distribution number), the secret information K being divided according to a first expression $K = K_1 \| K_2 \| \ldots \| K_{n_p-1}$ whose operators and symbols are defined according to a set of definitions including $\oplus$: Bitwise exclusive-or (XOR) operation $\|$: Concatenation of binary sequence n: The number of participants ($n \in N$, $2 \leq n$)

k: Threshold ($k \in N$, $2 \leq k \leq n$)

$n_p$: A prime number such that ($n_p \geq n$)

d: Data bit length in each processing ($d \in N$)

$p_i$: Participant ($i \in N_0$, $0 \leq i \leq n-1$)

K: Secret information ($K \in \{0,1\}^{d(n_p-1)}$)

$K_q$: A divided piece of secret information such that $K_q \in \{0,1\}^d$, $q \in N, 1 \leq q \leq n_p-1, K_1 \| K_2 \| \ldots K_{n_p-1} = K$ $K_0$: A dummy divided piece of secret information ($K_0 \in \{0\}^d$)

$R_l^t$: A random number ($R_l^t \in \{0,1\}^d, 0 \leq t \leq k-2, 0 \leq l \leq n_p-1$)

$S_i$: A share which is sent to the participant $P_i$ $S_{(i,m)}$: A piece of share $S_i$ which is sent to the participant $P_i$, ($S_{(i,0)} \| S_{(i,1)} \| \Lambda \| S_{(i,n_p-2)} = S, 0 \leq m \leq n_p-2$);

generating dummy partial secret information $K_0$, the symbol $K_0$ being defined according to the set of definitions;

generating sets of random numbers $R_l^t$ which are mutually independent, the symbol $R_l^t$ being defined according to the set of definitions;

generating pieces of shares using exclusive-OR (XOR) computation based upon the dummy partial secret information $K_0$, the divided pieces of secret information $K_q$, and the random numbers $R_l^t$, the pieces of shares being generated according to a second expression $$S_{(i,m)} = \left\{ \bigoplus_{t=0}^{k-2} R^t_{t,i+m} \right\} \oplus K_{m-i}, (0 \leq i \leq n-1, 0 \leq m \leq n_p - 2)$$

whose operators and symbols are defined according to the set of definitions; and concatenating the pieces of shares so as to generate n shares $S_i$, the pieces of shares being concatenated according to a third expression $S_i = S_{(i,0)} \| S_{(i,1)} \| \ldots \| S_{(i,n_p-3)} \| S_{(i,n_p-2)}$ whose operators and symbols are defined according to the set of definitions.

3. A computer program product comprising a computer-readable non-transitory storage medium having computer readable instructions recorded thereon, the computer readable instructions being operative, when performed by a computerized device, to cause the computerized device to:

divide inputted secret information K into same size ($n_p-1$) divided pieces of secret information $K_q$ ($n_p$ is a prime number which is equal to or greater than a secret distribution number), the secret information K being divided according to a first expression $K = K_1 \| K_2 \| \ldots \| K_{n_p-1}$ whose operators and symbols are defined according to a set of definitions including $\otimes$: Bitwise exclusive-or (XOR) operation $\|$: Concatenation of binary sequence n: The number of participants (n∈N, 2≦n)

k: Threshold (k∈N, 2≦k≦n)

$n_p$: A prime number such that ($n_p \geq n$)

d: Data bit length in each processing (d∈N)

$p_i$: Participant (i∈$N_0$, 0≦i≦n−1)

K: Secret information (K∈$\{0,1\}^{d(n_p-1)}$)

$K_q$: A divided piece of secret information such that $K_q \in \{0,1\}^d$, q∈N, 1≦q≦$n_p$−1, $K_1 \| K_2 \| \ldots K_{n_p-1}$=K $K_0$: A dummy divided piece of secret information ($K_0 \in \{0\}^d$)

$R^t_l$: A random number ($R^t_l \in \{0,1\}^d$, 0≦t≦k−2, 0≦n≦$n_p$−1)

$S_i$: A share which is sent to the participant $P_i$ $S_{(i,m)}$: A piece of share $S_i$ which is sent to the participant $P_i$, ($S_{(i,0)} \| S_{(i,1)} \| \Lambda \| S_{(i,n_p-2)}$=S, 0≦m≦$n_p$−2);

generate dummy partial secret information $K_0$, the symbol $K_0$ being defined according to the set of definitions;

generate sets of random numbers $R^t_l$ which are mutually independent, the symbol $R^t_l$ being defined according to the set of definitions;

generate pieces of shares using exclusive-OR (XOR) computation based upon the dummy partial secret information $K_0$, the divided pieces of secret information $K_q$, and the random numbers $R^t_l$, the pieces of shares being generated according to a second expression $$S_{(i,m)} = \left\{ \bigoplus_{t=0}^{k-2} R^t_{t,i+m} \right\} \oplus K_{m-i}, (0 \leq i \leq n-1, 0 \leq m \leq n_p - 2)$$

whose operators and symbols are defined according to the set of definitions; and concatenate the pieces of shares so as to generate n shares $S_i$, the pieces of shares being concatenated according to a third expression $S_i = s_{(i,0)} \| S_{(i,1)} \| \ldots \| S_{(i,n_p-3)} \| S_{(i,n_p-2)}$ whose operators and symbols are defined according to the set of definitions.

4. A secret information recovery apparatus which recovers secret information from pieces of shares generated by a threshold secret sharing apparatus according to claim 1 comprising:

a dividing means which divides k shares obtained beforehand into $n_p(k-1)$ pieces of shares, the shares being divided according to a first expression $$S_{(i_0,0)}, \quad S_{(i_0,1)}, \quad \ldots, \quad S_{(i_0,n_p-3)}, \quad S_{(i_0,n_p-2)},$$
$$\vdots \qquad \vdots \qquad \vdots \qquad \vdots \qquad \vdots$$
$$S_{(i_{k-1},0)}, \quad S_{(i_{k-1},1)}, \quad \ldots, \quad S_{(i_{k-1},n_p-3)}, \quad S_{(i_{k-1},n_p-2)},$$

whose operators and symbols are defined according to a set of definitions including $\otimes$: Bitwise exclusive-or (XOR) operation $\|$: Concatenation of binary sequence n: The number of participants (n∈N, 2≦n)

k: Threshold (k∈N, 2≦k≦n)

$n_p$: A prime number such that ($n_p \geq n$)

d: Data bit length in each processing (d∈N)

$p_i$: Participant (i∈$N_0$, 0≦i≦n−1)

K: Secret information (K∈$\{0,1\}^{d(n_p-1)}$)

$K_q$: A divided piece of secret information such that $K_q \in \{0,1\}^d$, q∈N, 1≦q≦$n_p$−1, $K_1 \| K_2 \| \ldots K_{n_p-1}$=K $K_0$: A dummy divided piece of secret information ($K_0 \in \{0\}^d$)

$R^t_l$: A random number ($R^t_l \in \{0,1\}^d$, 0≦t≦k−2, 0≦l≦$n_p$−1)

$S_i$: A share which is sent to the participant $P_i$ $S_{(i,m)}$: A piece of share $S_i$ which is sent to the participant $P_i$, ($S_{(i,0)} \| S_{(i,1)} \| \Lambda \| S_{(i,n_p-2)}$=S, 0≦m≦$n_p$−2); and a exclusive-OR (XOR) means which outputs ($n_p-1$) divided pieces of secret information by removing the random numbers with XOR operations, in increments of the set of random number, from each of the pieces of shares on the assumption that there are (k−1) sets of random numbers and there are the same $n_p$ random numbers for each set of random numbers, where the operators and symbols are defined according to the set of definitions; and a concatenating means which concatenates the divided pieces of secret information so as to recover the secret information K, the divided pieces of secret information being concatenated according to a second expression $K = K_1 \| K_2 \| \ldots \| K_{n_p-1}$ whose operators and symbols are defined according to a the set of definitions.

5. A secret information recovery apparatus which recovers secret information from pieces of shares generated by a threshold secret sharing method according to claim 2 comprising:

dividing k shares obtained beforehand into $n_p(k-1)$ pieces of shares, the shares being divided according to a first expression $$S_{(i_0,0)}, \quad S_{(i_0,1)}, \quad \ldots, \quad S_{(i_0,n_p-3)}, \quad S_{(i_0,n_p-2)},$$
$$\vdots \qquad \vdots \qquad \vdots \qquad \vdots \qquad \vdots$$
$$S_{(i_{k-1},0)}, \quad S_{(i_{k-1},1)}, \quad \ldots, \quad S_{(i_{k-1},n_p-3)}, \quad S_{(i_{k-1},n_p-2)},$$

whose operators and symbols are defined according to a set of definitions including $\otimes$: Bitwise exclusive-or (XOR) operation $\|$: Concatenation of binary sequence n: The number of participants (n∈N, 2≦n)

k: Threshold (k∈N, 2≦k≦n)

$n_p$: A prime number such that ($n_p \geq n$)

d: Data bit length in each processing (d∈N)

$p_i$: Participant (i∈$N_0$, 0≦i≦n−1)

K: Secret information (K∈$\{0,1\}^{d(n_p-1)}$)

$K_q$: A divided piece of secret information such that $K_q \in \{0,1\}^d$, $q \in N$, $1 \leq q \leq n_p-1$, $K_1 \| K_2 \| \ldots K_{n_p-1} = K$ $K_0$: A dummy divided piece of secret information ($K_0 \in \{0\}^d$)

$R_l^t$: A random number ($R_l^t \in \{0,1\}^d$, $0 \leq t \leq k-2$, $0 \leq l \leq n_p-1$)

$S_i$: A share which is sent to the participant $P_i$ $S_{(i,m)}$: A piece of share $S_i$ which is sent to the participant $P_i$, $(S_{(i,0)} \| S_{(i,1)} \| \Lambda \| S_{(i,n_p-2)} = S, 0 \leq m \leq n_p-2)$; and outputting ($n_p-1$) divided pieces of secret information by removing the random numbers with XOR operations, in increments of the set of random number, from each of the pieces of shares on the assumption that there are ($k-1$) sets of random numbers and there are the same $n_p$ random numbers for each set of random numbers, where the operators and symbols are defined according to the set of definitions; and concatenating the divided pieces of secret information so as to recover the secret information K, the divided pieces of secret information being concatenated according to a second expression $K = K_1 \| K_2 \| \ldots \| K_{n_p-1}$ whose operators and symbols are defined according to the set of definitions.

6. A computer program product comprising a computer-readable non-transitory storage medium having computer readable instructions recorded thereon for recovering secret information from pieces of shares generated by a computer program according to claim 3, the computer readable instructions being operative, when performed by a computerized device, to cause the computerized device to:

divide k shares obtained beforehand into $n_p(k-1)$ pieces of shares, the shares being divided according to a first expression $$S_{(i_0,0)}, \quad S_{(i_0,1)}, \quad \ldots, \quad S_{(i_0,n_p-3)}, \quad S_{(i_0,n_p-2)},$$
$$\vdots \qquad \vdots \qquad \vdots \qquad \vdots \qquad \vdots$$
$$S_{(i_{k-1},0)}, \quad S_{(i_{k-1},1)}, \quad \ldots, \quad S_{(i_{k-1},n_p-3)}, \quad S_{(i_{k-1},n_p-2)},$$

whose operators and symbols are defined according to a set of definitions including $\textcircled{x}$: Bitwise exclusive-or (XOR) operation $\|$: Concatenation of binary sequence n: The number of participants ($n \in N$, $2 \leq n$)

k: Threshold ($k \in N$, $2 \leq k \leq n$)

$n_p$: A prime number such that ($n_p \geq n$)

d: Data bit length in each processing ($d \in N$)

d: Participant ($i \in N_0$, $0 \leq i \leq n-1$)

K: Secret information ($K \in \{0,1\}^{d(n_p-1)}$)

$K_q$: A divided piece of secret information such that $K_q \in \{0,1\}^d$, $q \in N$, $1 \leq q \leq n_p-1$, $K_1 \| K_2 \| \ldots K_{n_p-1} = K$ $K_0$: A dummy divided piece of secret information ($K_0 \in \{0\}^d$)

$R_l^t$: A random number ($R_l^t \in \{0,1\}^d$, $0 \leq t \leq k-2$, $0 \leq l \leq n_p-1$)

$S_i$: A share which is sent to the participant $P_i$ $S_{(i,m)}$: A piece of share $S_i$ which is sent to the participant $P_i$, $(S_{(i,0)} \| S_{(i,1)} \| \Lambda \| S_{(i,n_p-2)} = S, 0 \leq m \leq n_p-2)$; and output ($n_p-1$) divided pieces of secret information by removing the random numbers with XOR operations, in increments of the set of random number, from each of the pieces of shares on the assumption that there are ($k-1$) sets of random numbers and there are the same $n_p$ random numbers for each set of random numbers, where the operators and symbols are defined according to the set of definitions; and concatenate the divided pieces of secret information so as to recover the secret information K, the divided pieces of secret information being concatenated according to a second expression $K = K_1 \| K_2 \| \ldots \| K_{n_p-1}$ whose operators and symbols are defined according to a the set of definitions.

* * * * *